US005243763A

United States Patent [19]

Persson

[11] Patent Number: 5,243,763

[45] Date of Patent: Sep. 14, 1993

[54] KNIFE FOR BUTTER, JAM AND SIMILAR FOOD PRODUCTS

[76] Inventor: Björn Persson, Östermalmsgatan 18, S-114 26 Stockholm, Sweden

[21] Appl. No.: 847,110

[22] PCT Filed: Oct. 12, 1990

[86] PCT No.: PCT/SE90/00655

§ 371 Date: Apr. 13, 1992

§ 102(e) Date: Apr. 13, 1992

[87] PCT Pub. No.: WO91/05638

PCT Pub. Date: May 2, 1991

[30] Foreign Application Priority Data

Oct. 13, 1989 [SE] Sweden ..................... 8903371

[51] Int. Cl.[5] ..................... B26B 27/00; A47J 43/28; B25G 1/00

[52] U.S. Cl. ..................... 30/298.4; 30/322; 30/340

[58] Field of Search ..................... 30/298, 298.4, 257, 30/260, 322, 324, 300, 340; 15/236.01

[56] References Cited

U.S. PATENT DOCUMENTS 260,157 6/1882 Brower ..................... 30/298.4
2,110,640 3/1938 Aldrich ..................... 30/322
3,275,187 9/1966 Lamoureaux ..................... 15/236.01
4,178,684 12/1979 Mightly ..................... 30/340
5,008,970 4/1991 Tsai et al. ..................... 30/340

FOREIGN PATENT DOCUMENTS 399520 8/1924 Fed. Rep. of Germany .
442591 4/1927 Fed. Rep. of Germany .
90580 10/1937 Sweden .

*Primary Examiner*—Frank T. Yost
*Assistant Examiner*—Paul M. Heyrana, Sr.
*Attorney, Agent, or Firm*—Burns, Doane, Swecker & Mathis

[57] ABSTRACT

A butter knife having a knife blade (10) and a handle (16) is configured at the junction between blade and handle with a transverse channel (26) whose side walls (20, 22) are substantially parallel and disposed perpendicularly to the blade. The rear wall (22) has a vertical extension which is approximately twice the vertical extension of the front wall (20), so as to form a stop when the knife blade is moved slidingly inwards on the rim (34) of a plastic tray (22) having a folded edge. The width of the chann el is such as to enable the channel to be pressed over the tray rim so as to clamp the knife firmly in a substantially horizontal position when the tray is placed on a table.

3 Claims, 2 Drawing Sheets

KNIFE FOR BUTTER, JAM AND SIMILAR FOOD PRODUCTS

BACKGROUND OF THE INVENTION

The present invention relates to a knife intended for spreading such foodstuffs as butter, jam and the like.

The foodstuffs concerned are normally delivered in thin-walled plastic trays, tubs or jar-shaped containers which are sealed with a lid firmly pressed onto the rim of the tray or tub by snap action. In the majority of cases, the tray rim has a U-shaped cross-section and presents a substantially flat abutment surface with which the lid sealingly abuts, and an outer, downwardly extending edge flange which coacts with an edge flange on the lid in a manner to secure the lid in position.

When the lid is removed and the tray is placed on the table, butter is removed from the tray with the aid of a knife, which may be made of metal, wood or plastic. In some cases, there is used a smaller knife which is intended particularly for spreading butter, although there is often used a knife taken from the standard assortment of cutlery. In this latter case, the knife is relatively heavy.

When the butter knife is shared by all seated at the table, the knife is kept in a position which will enable it to be reached by everyone. One method is to insert the knife in an upstanding position in the butter, which is possible when the tray or tub is relatively full, but which becomes impossible when the tray begins to be empty of butter. In this latter case, it is usual to place the knife with the handle resting on the table and the blade resting against the edge of the tray. If the knife is heavy, it tends to tip over the tray.

SUMMARY AND OBJECTS OF THE INVENTION

Hitherto, certain problems are encountered in placing the butter knife in a simple and positive fashion when the knife is not in use, and accordingly an object of the invention is to provide a knife for spreading butter and the like which can be placed readily and securely in position adjacent the tray and gripped comfortably in this position and returned thereto subsequent to being used.

This object is achieved with a knife according to the invention which is characterized in that the junction between the blade and the handle has a first transverse wall which constitutes an extension of the inner end of the knife blade and forms substantially a right angle with said blade; in that a second transverse wall forms an extension of the inner end of the handle and lies opposite said first wall; in that the two walls are substantially parallel and spaced from one another and joined by an upper intermediate wall such that the channel is defined by said three walls; in that the vertical extension of the second wall is substantially greater than the vertical extension of the first wall; in that the width of the channel is such as to fit over the edge of standard plastic trays, tubs and jar-shaped foodstuff containers, so as to enable the knife to be hooked onto the rim of the tray or clamped securely thereon in a storage position, with the aid of said channel.

When the inventive knife is made of plastic, the knife will be light in weight and, consequently, the tilting forces exerted on the rim of the tray at the clamping location will be relatively small. Another advantage with plastic knives is that the knives are inexpensive and can be thrown away after use without needing to be washed. The knife, however, may alternatively be manufactured from thin metal plate, e.g. stainless steel.

The inventive knife is so configured that if the knife is unintentionally placed on the table itself, the knife blade will lie freely above the table surface, irrespective of the side which faces towards the table surface, i.e. the knife will not soil the tablecloth.

A suitable embodiment of an inventive plastic knife is described below with reference to an exemplifying embodiment thereof illustrated in the accompanying drawings.

DETAILED DESCRIPTION OF PREFERRED EMBODIMENTS

Figure 1:
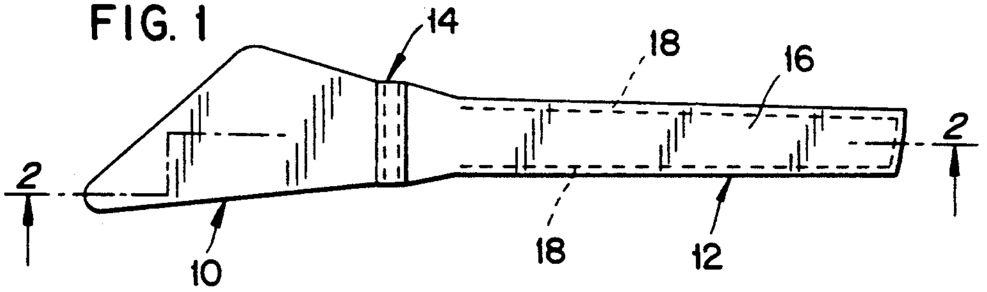
FIG. 1 is a top view of an inventive knife.
Figure 2:
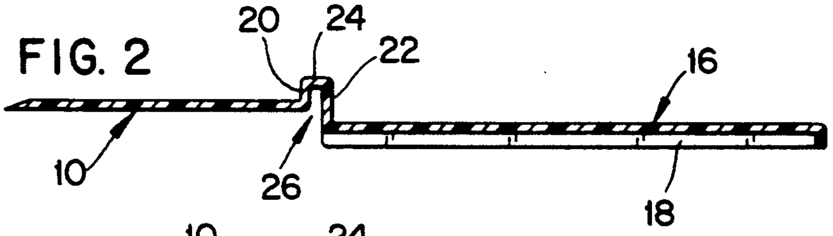
FIG. 2 is a longitudinal sectional view taken on the line II—II in FIG. 1.

The knife of the illustrated embodiment is made of plastic and comprises a knife blade 10 and a knife handle 12 and a junction 14 between the blade and the handle.

The handle has a U-section which presents an upper side 16 and two edge flanges 18.

The blade merges with a first transverse wall 20 which forms substantially a right angle with the knife blade.

The inner end of the knife handle, on the other hand, is extended with a second transverse wall 22 which forms substantially a right angle with the handle and is located at a predetermined distance from the first wall and connected therewith by means of an intermediate wall 24, such as to form a channel 26.

The vertical extension of the second wall 22 is substantially greater than the vertical extension of the first wall 20. In the illustrated case, the vertical extension of the second wall is approximately twice that of the first wall.

Both of the channel defining walls are preferably planar and substantially parallel with one another, although said walls may also have an arcuate shape with the centre of the arc lying on an axis which is perpendicular to the knife blade, so that the channel can be fitted more readily or to trays or tubs having arcuate edges, such as a cylindrical container.

Figure 3:
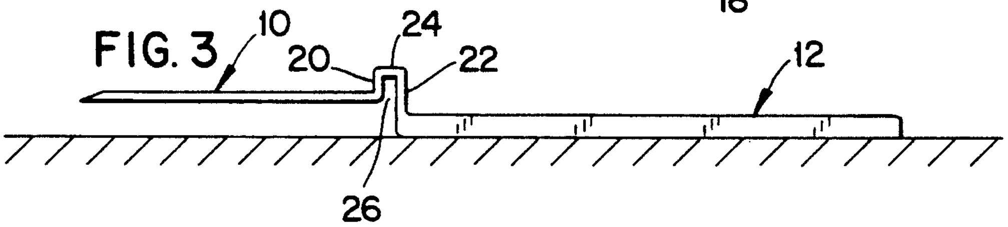
FIG. 3 is a side view of the knife with the knife handle resting on the table and the blade spaced from the table surface.

The handle is longer than the blade and is heavier than said blade. When the knife is lain on a table, as shown in FIG. 3, the blade will lie freely over the table surface, so that any butter or the like remaining on the blade will not come into contact with the table or the tablecloth.

Figure 4:
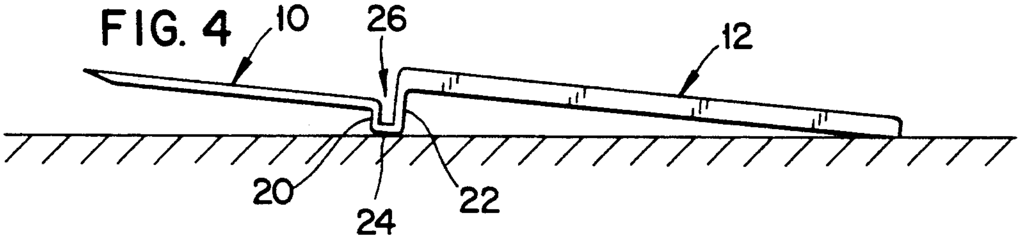
FIG. 4 is a side view of the knife in an inverse position relative to the position shown in FIG. 3, with the knife tilted such that the handle is supported against the table in an inclined position and the blade extends obliquely upwards free from the surface of the table.

The same protection is obtained when the knife is placed upside down as shown in FIG. 4, where the intermediate wall of said channel forms a rocking point, such that the handle will fall down and the blade be flipped-up to the free position shown in the Figure.

However, the channel is primarily intended to enable the knife to be clamped or clipped onto the rim of a plastic tray.

The illustrated plastic tray 28 comprises a bottom 30 and side walls 32 which terminate in a folded rim 34 of substantially U-section. The rim will preferably have a flat upper surface 36, against which the lid (not shown) is intended to sealingly abut. The outer flange 38 of the rim is terminated with an outwardly extending edge flange 40, which forms a lid stop when the lid is snapped firmly onto the rim, while pressing-in the resilient outer flange.

Figure 5:
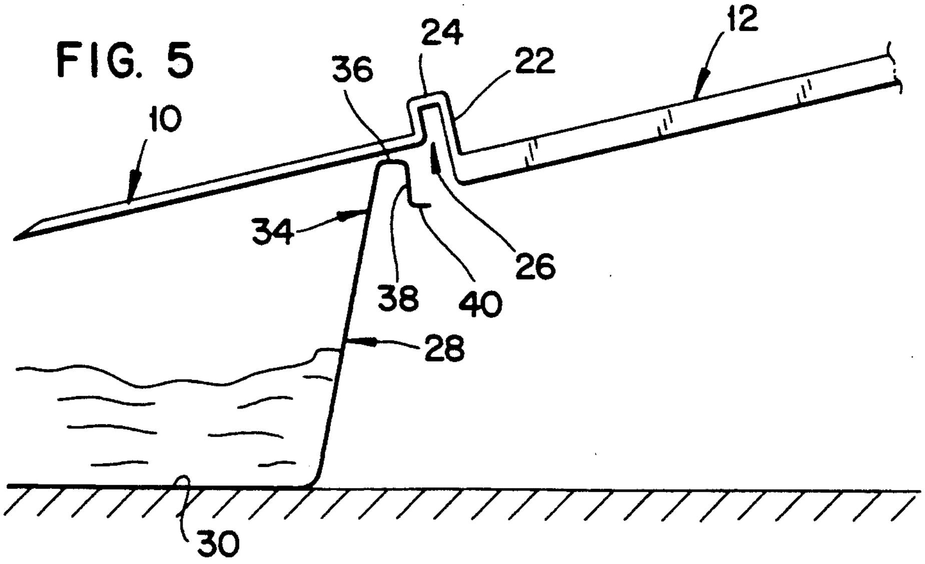
FIG. 5 is a sectional view of a standard plastic tray or tub and shows the knife in a position adjacent the rim of the tray prior to being clamped firmly to said rim.

FIG. 5 illustrates the knife in a position adjacent the rim of the tray.

Figure 6:
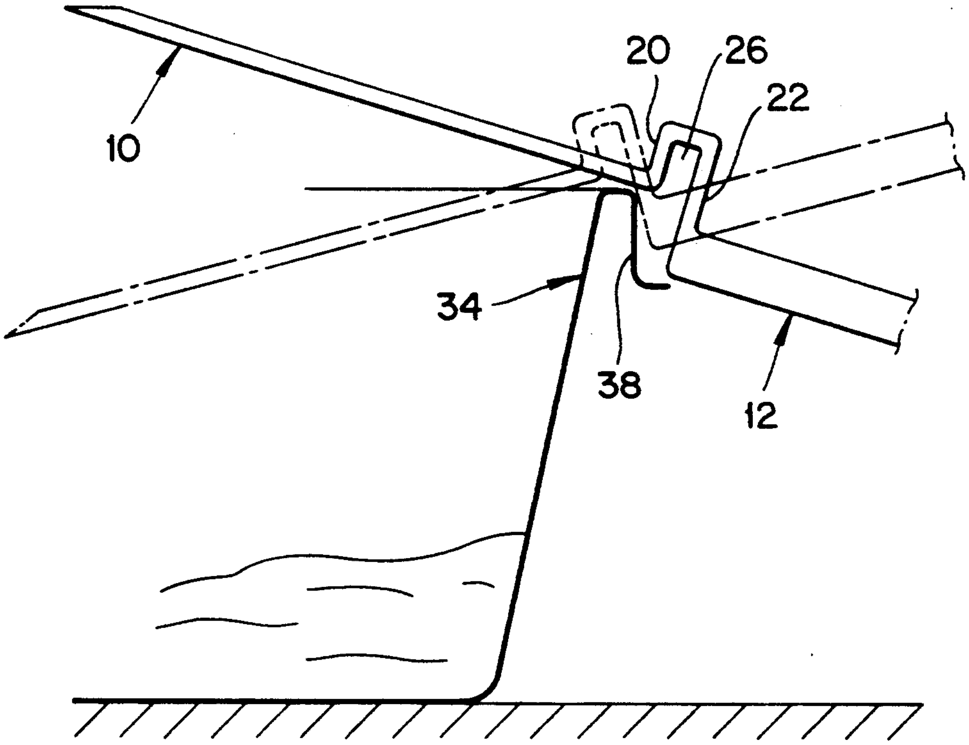
FIG. 6 illustrates the knife in a position in which it rests on the rim of the tray before being clamped firmly onto the rim, and shows in chain lines another knife position in which said knife supports against the rim prior to being clamped firmly thereto.
Figure 7:
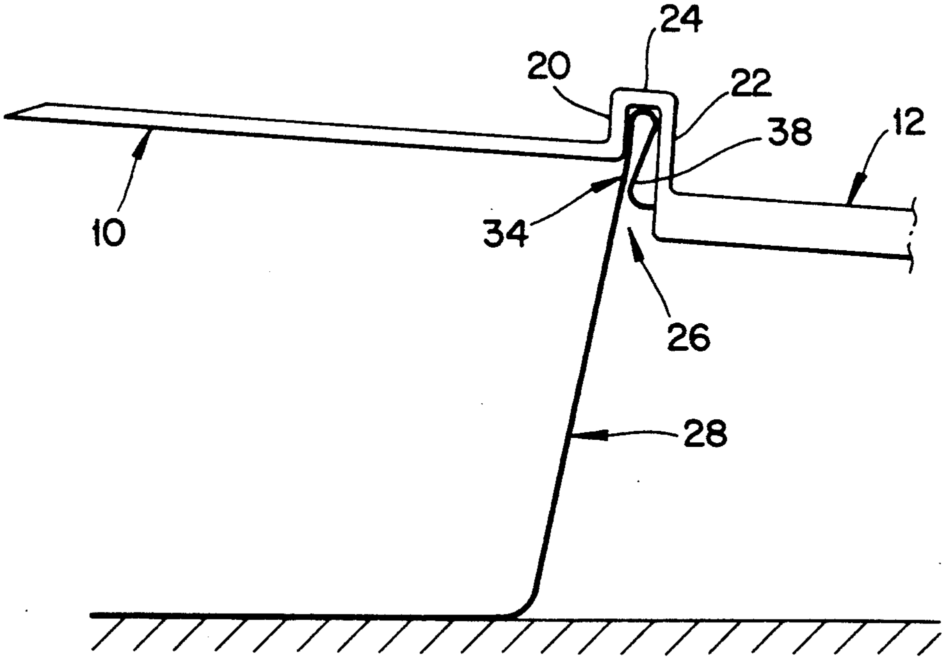
FIG. 7 illustrates the knife when clamped firmly onto the rim of the tray.

The knife can be brought towards the rim in different ways, as illustrated in FIG. 6. The full-line illustration in FIG. 6 shows the knife in an upwardly tilted position, with the knife blade resting on the rim of the tray and the knife displaced towards the rim to a position in which the right transverse wall 22 is in abutment with the edge flange, said flange forming a stop which determines the position of the knife or the channel in relation to said edge flange. Continued movement of the knife in towards the tray causes the transverse wall to bend the outer flange 38 resiliently inwards, whereafter the knife can be pressed down so that the channel fits firmly, through friction, around the tray rim in the storage position shown in FIG. 7, where the knife takes a position substantially parallel with the bottom of the tray.

Alternatively, as shown in FIG. 6, the knife may be inclined downwardly when the blade is displaced forwards on the tray rim, in which case the channel will be located above the rim when the transverse wall 22 is in contact with said rim. This is the position in which the knife can be pressed downwardly as soon as the transverse wall halts the forward movement of the knife.

Since the plastic knife is mass produced at a low cost, a number of knives can be placed on the rim of one and the same tray and then discarded after use, instead of washing the knives.

However, the inventive knife can be readily punched and shaped from thin metal plate of sufficient rigidity, e.g. stainless steel, without appreciably influencing the advantages afforded by the inventive knife. In this case, the blade and the handle will weigh approximately the same when the knife is clamped onto the tray rim, although with the handle slightly heavier.

I claim:

1. A knife intended for spreading, comprising:

a handle;

a knife blade; and a junction between the blade and the handle which has a first transverse wall which forms an extension of an inner end of the blade and is disposed substantially at right angles to the knife blade; a second transverse wall which forms an extension at the inner end of the handle and lies opposite the first transverse wall substantially parallel therewith; the two walls being spaced apart and mutually connected by an intermediate wall such as to define a channel between the three walls; a vertical extension of the second wall is substantially greater than a vertical extension of the first wall; and the distance between the two transverse walls is such that a width of the channel formed conforms to a width of a rim of a container for foodstuff in a manner such that the knife can be hooked onto the rim or clamped firmly thereto in a storage position with the aid of said channel.

2. A knife according to claim 1, wherein the vertical extension of the second transverse wall is at least approximately twice that of the first transverse wall.

3. A knife according to claim 1, wherein the first and the second wall are arcuately shaped having a centre axis which passes through and is substantially perpendicular to said knife blade, such that the channel will fit readily onto a container having an arcuate edge.

* * * * *